United States Patent [19]

Chauncey

[11] Patent Number: 5,782,504
[45] Date of Patent: Jul. 21, 1998

[54] ROTATABLE WATER CONDUIT COUPLE FOR A PIT GUN

[76] Inventor: Samuel Thomas Chauncey, 4641 Harden Blvd., Lakeland, Fla. 33813

[21] Appl. No.: 745,293

[22] Filed: Nov. 8, 1996

[51] Int. Cl.$^6$ .................................................. F16L 27/00
[52] U.S. Cl. .......................... 285/147.3; 285/276; 285/281
[58] Field of Search ......................... 285/98, 276, 281, 285/272, 349, 351, 368, 147.3; 29/587.2

[56] References Cited

U.S. PATENT DOCUMENTS

| | | | |
|---|---|---|---|
| 2,986,344 | 5/1961 | Knight | 285/276 X |
| 3,314,694 | 4/1967 | Faccou | 285/276 X |
| 3,567,256 | 3/1971 | Haley | 285/276 X |
| 4,407,533 | 10/1983 | Giebeler | 285/349 X |
| 4,620,728 | 11/1986 | Barth et al. | 285/286 X |

FOREIGN PATENT DOCUMENTS

| | | | |
|---|---|---|---|
| 32088 | 8/1923 | Denmark | 285/276 |
| 1277225 | 10/1961 | France | 285/281 |

Primary Examiner—Dave W. Arola

[57] ABSTRACT

A rotatable water conduit couple for a pit gun including a water conduit couple with a first portion having a hollow cylinder with a first end and a second end. A disk is coupled coaxially to the first end of the hollow cylinder with a plurality of coupling apertures formed therethrough adjacent a periphery thereof. A flange is integrally formed about the hollow cylinder and extended radially therefrom adjacent the second end thereof. Further provided is an annular second portion having an end surface with a plurality of threaded bolts coupled thereto and extended perpendicularly therefrom in parallel with an axis about which the cylinder of the first portion is situated. The second portion further includes a stepped inboard surface with at least one step formed therein. By this structure, the flange of the first portion slidably abuts the step of the second portion forming an annular compartment for allowing a gasket to be situated therein.

6 Claims, 3 Drawing Sheets

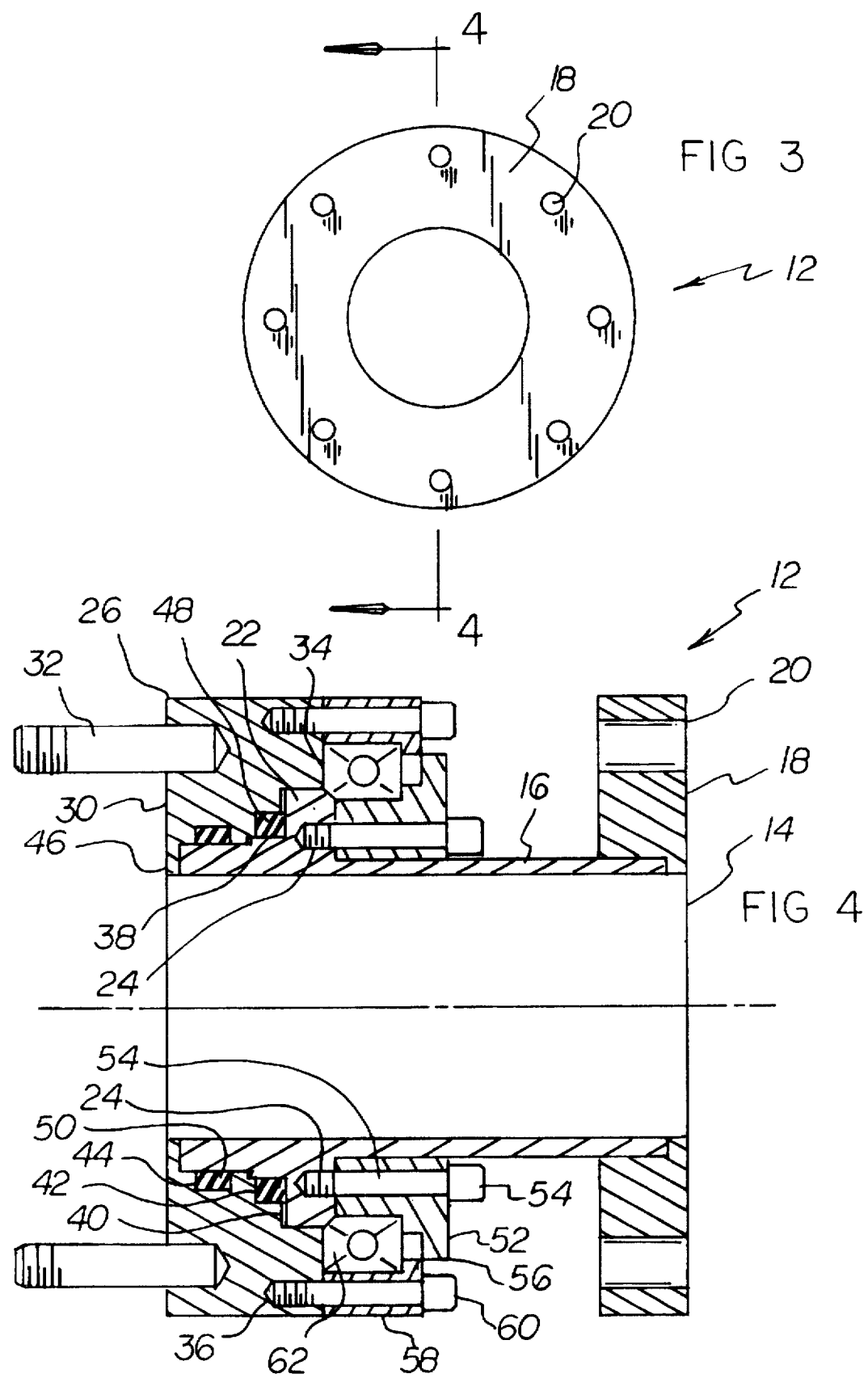

ROTATABLE WATER CONDUIT COUPLE FOR A PIT GUN

BACKGROUND OF THE INVENTION

1. Field of the Invention

The present invention relates to a rotatable water conduit couple for a pit gun and more particularly pertains to providing a unique water conduit couple for use with a pit gun.

2. Description of the Prior Art

The use of rotatable water couples is known in the prior art. More specifically, rotatable water couples heretofore devised and utilized for the purpose of allowing for pivoting of coupled water conduits are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 3,583,637 to Miscovich and assigned to Stang Hydronics, Inc; U.S. Pat. No. 3,575,351 to Warren and assigned to Stang Hydronics, Inc; U.S. Pat. No. 4,126,275 to Timberlake et al. and assigned to American Cyanamid Company; U.S. Pat. No. 4,492,514 to Dron and assigned to Stang Hydronics, Inc; U.S. Pat. No. 3,575,060 to Warren and assigned to Stang Hydronics, Inc; U.S. Pat. No. 3,604,627 to Miscovich and assigned to Stang Hydronics, Inc; and U.S. Patent Des. 271,585 to Bradford and assigned to Stang Hydronics, Inc.

In this respect, the rotatable water conduit couple for a pit gun according to the present invention substantially departs from the conventional concepts and designs of the prior art, and in so doing provides an apparatus primarily developed for the purpose of providing a unique water conduit couple for use with a pit gun.

Therefore, it can be appreciated that there exists a continuing need for a new and improved rotatable water conduit couple for a pit gun which can be used for providing a unique water conduit couple for use with a pit gun. In this regard, the present invention substantially fulfills this need.

SUMMARY OF THE INVENTION

In view of the foregoing disadvantages inherent in the known types of rotatable water couples now present in the prior art, the present invention provides an improved rotatable water conduit couple for a pit gun. As such, the general purpose of the present invention, which will be described subsequently in greater detail, is to provide a new and improved rotatable water conduit couple for a pit gun which has all the advantages of the prior art and none of the disadvantages.

To attain this, the present invention essentially comprises a water conduit couple. The water couple is constructed from a heavy duty metal and comprises a first portion including a hollow cylinder with a first end and a second end. A disk is coupled coaxially to the first end of the hollow cylinder. A plurality of coupling apertures are formed in the disk adjacent a periphery thereof. As can best be seen in FIG. 4, a flange is integrally formed about the hollow cylinder and extended radially therefrom adjacent the second end thereof. A plurality of threaded bores are formed in a surface of the flange facing the disk. Further included is an annular second portion having an outboard smooth surface. The second portion further has a smooth end surface with a plurality of threaded bolts coupled thereto adjacent the outboard surface and extending perpendicularly therefrom in parallel with an axis about which the cylinder of the first portion is situated. A smooth intermediate surface is also included with a plurality of threaded bores formed therein which reside adjacent the outboard surface. The second portion further includes a stepped inboard surface. Such stepped surface includes a first step extending radially inward and a second step extending radially inward contiguously below the first step. Associated therewith is a cut out formed below the second step. Formed at a bottom of the inboard surface is a lip which extends radially inwardly. By this structure, the second end of the first portion of the couple is adapted to be inserted within the second portion such that the second end of the first portion slidably abuts the lip of the second portion. Further, the flange of the first portion slidably abuts the first step of the second portion forming a first annular compartment. Such annular compartment is defined by the second step of the second portion. Yet another annular compartment is defined by the cut out of the second portion. For providing a sealed couple, a first annular gasket is situated within the first annular compartment. Also, a second annular gasket is situated within the second annular compartment. Further provided is a first annular bearing retainer having an L-shaped cross-section. The first annular bearing retainer has a first extent with a plurality of bores formed therein for inserting a plurality of bolts therethrough. Such bolts further threadedly couple within the threaded bores of the flange of the first portion. The first bearing retainer also has a second extent extending above and in parallel with the intermediate surface of the second portion. A second annular bearing retainer is also included having a plurality of bores formed therethrough for inserting a plurality of bolts therethrough. Such bolts are adapted to be further threadedly coupled within the threaded bores of the linear intermediate surface of the second portion. As such, an annular compartment is formed between the first bearing retainer and the second bearing retainer. For allowing smooth swivelling between the portions of the water conduit couple, a plurality of bearings are situated within the bearing compartment. The bearings are maintained in the proper position via the tightening of the bolts of the bearing retainers.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved rotatable water conduit couple for a pit gun which has all the advantages of the prior art rotatable water couples and none of the disadvantages.

It is another object of the present invention to provide a new and improved rotatable water conduit couple for a pit gun which may be easily and efficiently manufactured and marketed.

It is a further object of the present invention to provide a new and improved rotatable water conduit couple for a pit gun which is of a durable and reliable construction.

An even further object of the present invention is to provide a new and improved rotatable water conduit couple for a pit gun which is susceptible of a low cost of manufacture with regard to both materials and labor, and which accordingly is then susceptible of low prices of sale to the consuming public, thereby making such rotatable water conduit couple for a pit gun economically available to the buying public.

Still yet another object of the present invention is to provide a new and improved rotatable water conduit couple for a pit gun which provides in the apparatuses and methods of the prior art some of the advantages thereof, while simultaneously overcoming some of the disadvantages normally associated therewith.

Still another object of the present invention is to provide a unique water conduit couple for use with a pit gun.

Lastly, it is an object of the present invention to provide a new and improved rotatable water conduit couple for a pit gun including a water conduit couple with a first portion having a hollow cylinder with a first end and a second end. A disk is coupled coaxially to the first end of the hollow cylinder with a plurality of coupling apertures formed therethrough adjacent a periphery thereof. A flange is integrally formed about the hollow cylinder and extended radially therefrom adjacent the second end thereof. Further provided is an annular second portion having an end surface with a plurality of threaded bolts coupled thereto and extended perpendicularly therefrom in parallel with an axis about which the cylinder of the first portion is situated. The second portion further includes a stepped inboard surface with at least one step formed therein. By this structure, the flange of the first portion slidably abuts the step of the second portion forming an annular compartment for allowing a gasket to be situated therein.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a plan view of the first portion of the present invention.

FIG. 4 is a cross-sectional view of the present invention taken along line 4—4 shown in FIG. 3.

Similar reference characters refer to similar parts throughout the several views of the drawings.

DESCRIPTION OF THE PREFERRED EMBODIMENT

Figure 1:
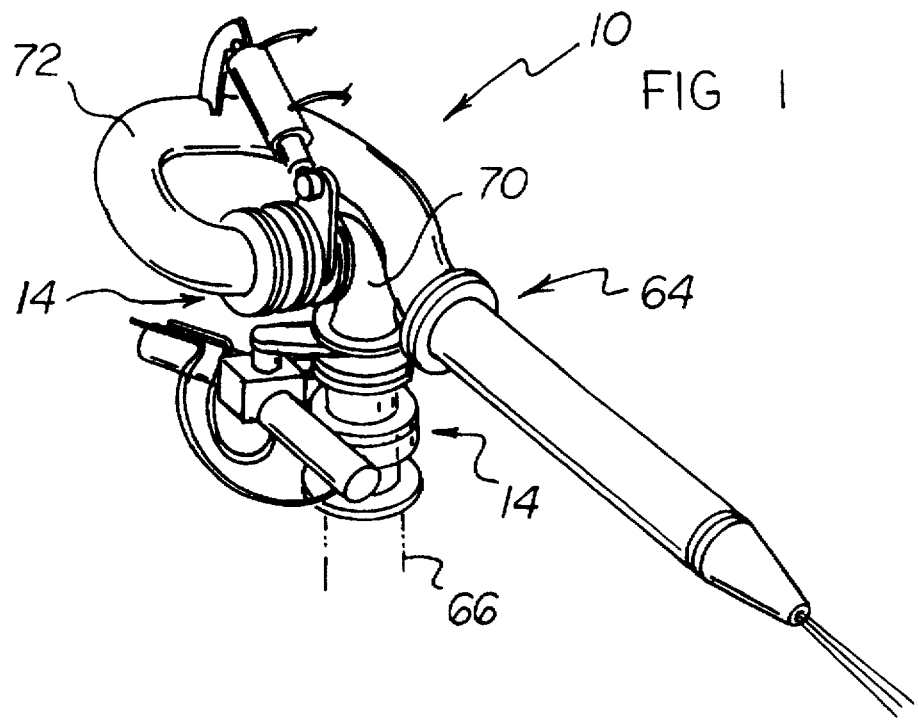
FIG. 1 is a perspective illustration of the preferred embodiment of the rotatable water conduit couple for a pit gun constructed in accordance with the principles of the present invention.
Figure 2:
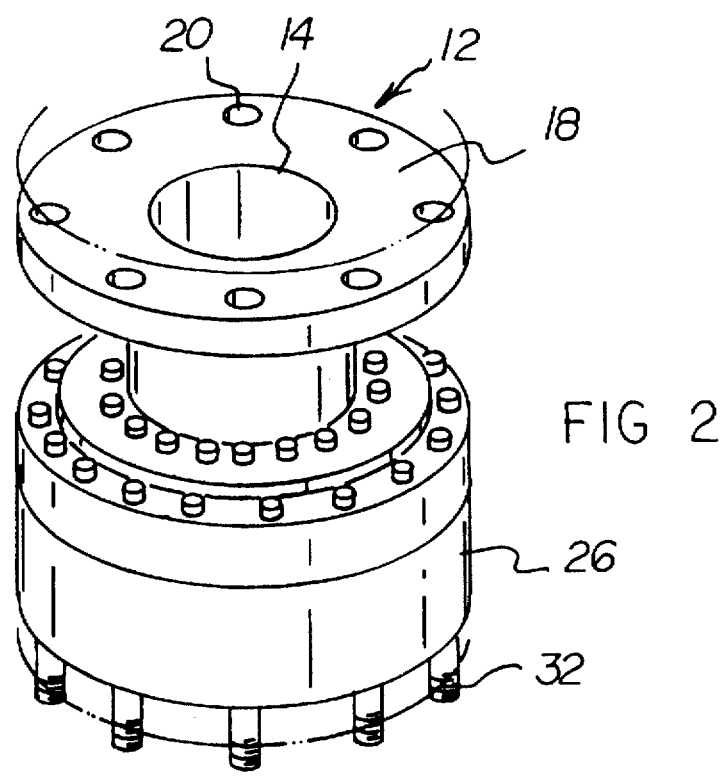
FIG. 2 is a perspective view of the present invention with the first portion thereof on top.
Figure 5:
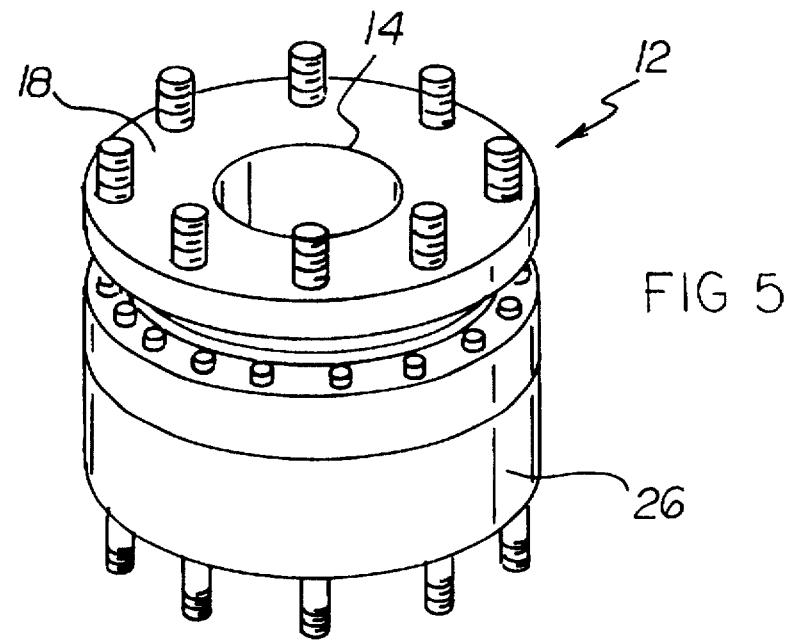
FIG. 5 is a perspective view of the present invention with the first portion thereof on top with bolts situated within the apertures thereof.
Figure 6:
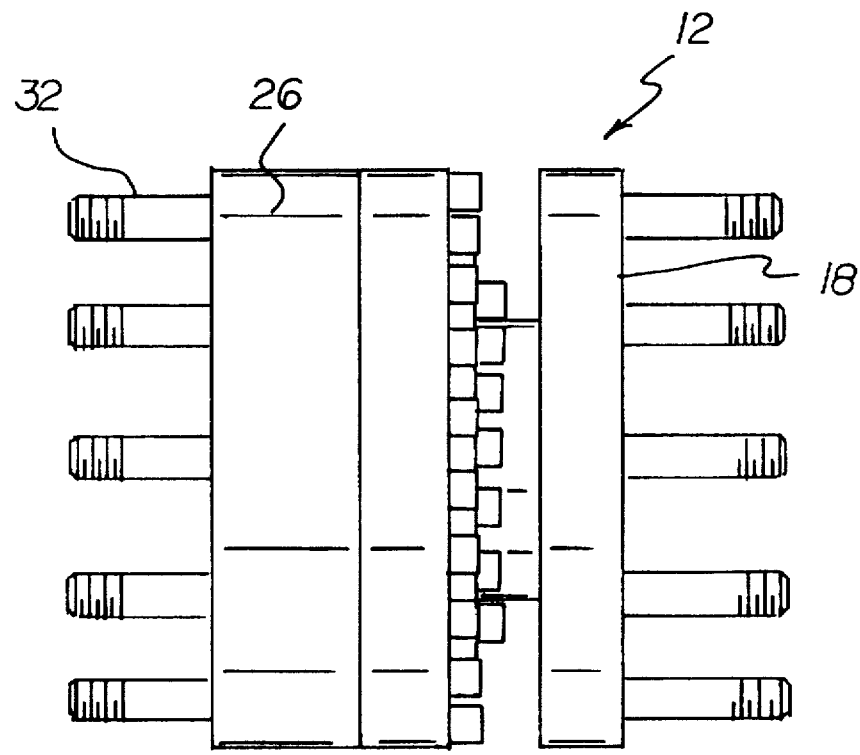
FIG. 6 is a side elevational view of the present invention.

With reference now to the drawings, and in particular to FIG. 1 thereof, a new and improved rotatable water conduit couple for a pit gun embodying the principles and concepts of the present invention and generally designated by the reference numeral 10 will be described.

The present invention, the new and improved rotatable water conduit couple for a pit gun, is comprised of a plurality of components. Such components in their broadest context include water conduit couple and a pit gun. Such components are individually configured and correlated with respect to each other so as to attain the desired objective.

More specifically, it will be noted that the system 10 of the present invention includes a water conduit couple 12. The water couple is constructed from a heavy duty metal and comprises a first portion 14 including a hollow cylinder 16 with a first end and a second end. The hollow cylinder is adapted to allow liquid to pass therethrough. A disk 18 is coupled coaxially to the first end of the hollow cylinder. A plurality of coupling apertures 20 are formed in the disk adjacent a periphery thereof. As can best be seen in FIG. 4, a flange 22 is integrally formed about the hollow cylinder and extended radially therefrom adjacent the second end thereof. The flange extends outwardly from the hollow cylinder half the distance which the disk extends. A plurality of threaded bores 24 are formed in a surface of the flange facing the disk.

Further included as a component of the water conduit couple is an annular second portion 26 having an outboard smooth surface 28. The second portion 26 further has a smooth end surface 30 with a plurality of threaded bolts 32 coupled thereto adjacent the outboard surface and extending perpendicularly therefrom in parallel with an axis about which the cylinder of the second portion 14 is situated. A smooth intermediate surface 34 is also included with a plurality of threaded bores 36 formed therein which reside adjacent the outboard surface. The second portion 26 further includes a stepped inboard surface 38. Such stepped surface includes a first step 40 extending radially inward and a second step 42 extending radially inward contiguously below the first step, wherein the circumference defined by the second step is less than that defined by first step. Associated therewith is a cut out 44 formed below the second step with a circumference equal to that of the second step. Formed at a bottom of the inboard surface is a lip 46 which extends radially inwardly.

By this structure, the second end of the second portion 14 of the couple is adapted to be inserted within the second portion such that the second end of the second portion 14 slidably abuts the lip of the second portion. Further, the flange of the second portion 14 slidably abuts the first step of the second portion 26 forming a first annular compartment. Such annular compartment is defined by the second step of the second portion. Yet another annular compartment is defined by the cut out of the second portion. Preferably, a space which is approximately 25% of the length of the water conduit is situated between the disk and the second annular portion.

For providing a sealed couple, a first annular gasket 48 is situated within the first annular compartment. Also, a second annular gasket 50 is situated within the second annular compartment.

Further provided is a first annular bearing retainer 52 having an L-shaped cross-section. The first annular bearing retainer has a first extent with a plurality of bores formed therein for inserting a plurality of bolts 54 therethrough. Such bolts further threadedly couple within the threaded bores of the flange of the first portion, thereby remaining fixed with respect to the first portion. The first bearing retainer also has a second extent 56 extending above and in parallel with the intermediate surface of the second portion. A second annular bearing retainer 58 is also included having a plurality of bores formed therethrough for inserting a plurality of bolts 60 therethrough. Such bolts are adapted to be further threadedly coupled within the threaded bores of the linear intermediate surface of the second portion, thereby remaining fixed with respect to the second portion. As such, an annular compartment is formed between the first bearing retainer and second bearing retainer. A space between the abutment between the first bearing retainer and second bearing retainer is preferably designed to be minimal, as shown in FIG. 4.

For allowing smooth swivelling between the portions of the water conduit couple, a plurality of bearings 62 are situated within the bearing compartment. The bearings are maintained in the proper position via the tightening of the bolts of the bearing retainers. Preferably, the second extent of the first bearing retainer has notch formed therein for allowing grease to reside adjacent the bearings.

As shown in FIG. 1, a pit gun 64 is included in which the water couple may be utilized. It should be noted that the present pit gun is only illustrative as a preferred embodiment and that the water conduit couple may be utilized in any one of many pit guns. The pit gun of the preferred embodiment includes a first lower water conduit 66 having a vertical orientation. The bolts of the end of the second portion 26 of a first water conduit couple are utilized for coupling to an end of the vertical extent.

Further provided is a second intermediate water conduit 70 having a generally L-shaped configuration with a horizontal extent and a vertical extent. For effecting proper utilization of the water conduit couple, a plurality of bolts are inserted through the apertures of the disk of the second portion 14 of the first water conduit couple and further secured to an end of the vertical extent of the second water conduit. Further, the bolts of the end surface of the second portion 26 of a second water conduit couple are utilized for coupling to an end of the horizontal extent of the second water conduit. For allowing automated pivoting of the second water conduit with respect to the first water conduit about a vertical axis, a hydraulic mechanism is coupled therebetween.

Finally, a third upper water conduit 72 having a generally P-shaped configuration is included. The third upper conduit resides generally within a horizontal plane. As shown in FIG. 1, the third upper water conduit includes a first end with a dispensing nozzle coupled thereto. A plurality of bolts are inserted through the apertures of the disk of the second portion 14 of the second water conduit couple. Such bolts are further secured to a second end of the third upper water conduit. For allowing automated pivoting of the third water conduit with respect to the second water conduit about a horizontal axis, a hydraulic mechanism is coupled therebetween. Such hydraulic mechanism is coupled between a top extent of the first water conduit and the horizontal extent of the second water conduit.

By this structure, the nozzle may be swivelled about both a vertical axis and a horizontal axis for dispensing fluids within a pit.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by letters patent of the United States is as follows:

1. A new and improved rotatable water conduit couple for a pit gun comprising, in combination:

at least two water conduit couples each constructed from a metal and comprising a first portion including a hollow cylinder with a first end and a second end, a disk coupled coaxially to the first end of the hollow cylinder with a plurality of coupling apertures formed therethrough adjacent a periphery thereof, a flange integrally formed about the hollow cylinder and extending radially therefrom adjacent the second end thereof with a plurality of threaded bores formed in a surface thereof facing the disk; an annular second portion having an outboard smooth surface, a smooth end surface with a plurality of threaded bolts coupled thereto adjacent the outboard surface and extending perpendicularly therefrom in parallel with an axis about which the cylinder of the first portion is situated, a smooth intermediate surface with a plurality of threaded bores formed therein adjacent the outboard surface, and a stepped inboard surface with a first step extending radially inward, a second step extending radially inward contiguously below the first step, a cut out formed below the second step, and a lip formed at a bottom of the inboard surface and extending radially inwardly, the second end of the first portion of the couple being inserted within the second portion such that the second end of the first portion slidably abuts the lip of the second portion and the flange of the first portion slidably abuts the first step of the second portion forming a first annular compartment defined by the second step of the second portion and a second annular compartment defined by the cut out of the second portion; a first annular gasket situated within the first annular compartment; a second annular gasket situated within the second annular compartment; a first annular bearing retainer having an L-shaped cross-section with a first extent having a plurality of bores formed therethrough for inserting a plurality of bolts therethrough and further threadedly coupling the bolts within the threaded bores of the flange of the first portion, the first bearing retainer further having a second extent extending in parallel with the intermediate surface of the second portion; a second annular bearing retainer having a plurality of bores formed therethrough for inserting a plurality of bolts therethrough and further threadedly coupling the bolts within the threaded bores of a linear intermediate surface of the second portion thereby forming an annular compartment with the first bearing retainer; and a plurality of bearings situated within the bearing compartment and maintained in the proper position via the tightening of the bolts of the bearing retainers;

a first lower water conduit with a vertical orientation, wherein the bolts of the end surface of the second portion of a first water conduit couple are utilized for coupling to an end of the first lower water conduit;

a second intermediate water conduit having a generally L-shaped configuration with a horizontal extent and a vertical extent, wherein a plurality of bolts are inserted through the apertures of the disk of the first portion of the first water conduit couple and further secured to an end of the vertical extent of the second water conduit and further the bolts of the end surface of the second portion of a second water conduit couple are utilized for coupling to an end of the horizontal extent of the second water conduit; and a third upper water conduit having a generally P-shaped configuration which resides generally within a horizontal plane, the third upper water conduit having a first end with a dispensing nozzle coupled thereto, wherein a plurality of bolts are inserted through the apertures of the disk of the first portion of the second water conduit couple and further secured to a second end of the third upper water conduit;

said nozzle being swivelled about both a vertical axis and a horizontal axis for dispensing fluids within a pit.

2. A rotatable water conduit couple for a pit gun comprising:

a first portion including a hollow cylinder with a first end, a second end, a disk coupled coaxially to the first end of the hollow cylinder with a plurality of coupling apertures formed therethrough adjacent a periphery thereof, and a flange integrally formed about the hollow cylinder and extending radially therefrom adjacent the second end thereof;

an annular second portion having an end surface with a plurality of threaded bolts coupled thereto and extending perpendicularly therefrom in parallel with an axis about which the cylinder of the first portion is situated, and a stepped inboard surface with at least one step formed therein, the flange of the first portion slidably abutting the at least one step of the second portion forming an annular compartment for allowing a gasket to be situated therein, wherein the second portion is rotatable with respect to the first portion; and a first annular bearing retainer having an L-shaped cross-section with a first extent having a plurality of bores formed therethrough for inserting a plurality of bolts therethrough and further threadedly coupling the bolts within a plurality of threaded bores formed in the flange of the first portion, the first bearing retainer further having a second extent extending in parallel with the second portion.

3. A rotatable water conduit couple for a pit gun as set forth in claim 2 and further including a second annular bearing retainer having a plurality of bores formed therethrough for inserting a plurality of bolts therethrough and further threadedly coupling the bolts within a plurality of threaded bores formed in a linear intermediate surface of the second portion thereby forming an annular compartment with the first bearing retainer, a plurality of bearings being situated within the bearing compartment and maintained in the proper position via the tightening of the bolts of the bearing retainers.

4. A rotatable water conduit couple for a pit gun comprising:

a first portion including a hollow cylinder with a first end, a second end, a disk coupled coaxially to the first end of the hollow cylinder with a plurality of coupling apertures formed therethrough adjacent a periphery thereof, and a flange integrally formed about the hollow cylinder and extending radially therefrom adjacent the second end thereof;

an annular second portion having an end surface with a plurality of threaded bolts coupled thereto and extending perpendicularly therefrom in parallel with an axis about which the cylinder of the first portion is situated, and a stepped inboard surface with at least one step formed therein, the flange of the first portion slidably abutting the at least one step of the second portion forming an annular compartment for allowing a gasket to be situated therein, wherein the second portion is rotatable with respect to the first portion; and a first lower water conduit with a vertical orientation, wherein the bolts of the end surface of the second portion of a first water conduit couple are utilized for coupling to an end of the first lower water conduit.

5. A rotatable water conduit couple for a pit gun as set forth in claim 4 and further including a second intermediate water conduit having a generally L-shaped configuration with a horizontal extent and a vertical extent, wherein a plurality of bolts are inserted through the apertures of the disk of the first portion of the first water conduit couple and further secured to an end of the vertical extent of the second water conduit and further the bolts of the end surface of the second portion of a second water conduit couple are utilized for coupling to an end of the horizontal extent of the second water conduit.

6. A rotatable water conduit couple for a pit gun as set forth in claim 5 and further including a third upper water conduit having a generally P-shaped configuration which resides generally within a horizontal plane, the third upper water conduit having a first end with a dispensing nozzle coupled thereto, wherein a plurality of bolts are inserted through the apertures of the disk of the first portion of the second water conduit couple and further secured to a second end of the third upper water conduit.

* * * * *